United States Patent
Oshins

(10) Patent No.: US 7,363,407 B2
(45) Date of Patent: Apr. 22, 2008

(54) CONCURRENT ARBITRATION OF MULTIDIMENSIONAL REQUESTS FOR INTERRUPT RESOURCES

(75) Inventor: Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 367 days.

(21) Appl. No.: 10/673,805

(22) Filed: Sep. 29, 2003

(65) Prior Publication Data

US 2005/0071531 A1    Mar. 31, 2005

(51) Int. Cl.
*G06F 13/24* (2006.01)

(52) U.S. Cl. .................. 710/260; 710/268; 710/269

(58) Field of Classification Search ........ 710/260–269, 710/300–306, 45–50, 8–19
See application file for complete search history.

(56) References Cited

U.S. PATENT DOCUMENTS

| | | | |
|---|---|---|---|
| 5,564,062 A | 10/1996 | Meaney et al. | |
| 5,708,814 A * | 1/1998 | Short et al. | 710/260 |
| 5,761,492 A * | 6/1998 | Fernando et al. | 712/244 |
| 5,793,979 A | 8/1998 | Lichtman et al. | |
| 5,809,329 A | 9/1998 | Lichtman et al. | |
| 5,881,252 A | 3/1999 | Sahgal et al. | |
| 5,937,199 A * | 8/1999 | Temple | 710/262 |
| 6,115,779 A * | 9/2000 | Haubursin et al. | 710/262 |
| 6,370,606 B1 * | 4/2002 | Bonola | 710/260 |
| 6,378,023 B1 * | 4/2002 | Christie et al. | 710/260 |
| 6,412,035 B1 * | 6/2002 | Webber | 710/261 |
| 6,470,407 B1 * | 10/2002 | Losi | 710/264 |
| 6,499,078 B1 * | 12/2002 | Beckert et al. | 710/260 |
| 6,502,152 B1 * | 12/2002 | Laurenti | 710/264 |
| 6,598,105 B1 | 7/2003 | Oshins et al. | |
| 6,636,916 B1 * | 10/2003 | Campbell et al. | 710/266 |
| 6,813,666 B2 * | 11/2004 | Joffrain | 710/264 |
| 6,865,636 B1 * | 3/2005 | Hober et al. | 710/260 |
| 6,877,057 B2 * | 4/2005 | Alexander et al. | 710/263 |
| 2002/0019902 A1 * | 2/2002 | Christie | 710/260 |
| 2005/0027914 A1 * | 2/2005 | Hammalund et al. | 710/260 |

OTHER PUBLICATIONS

Michael B. Jones and John Regehr, "Issues in Using Commodity Operating Systems for Time-Dependent Tasks: Experiences from a Study of Windows NT", 4 pages, 1998.

* cited by examiner

*Primary Examiner*—Raymond N Phan
(74) *Attorney, Agent, or Firm*—Amin, Turocy & Calvin, LLP

(57) ABSTRACT

The present invention relates to a system and methodology to facilitate negotiation, assignment, and management of interrupt resources in a flexible and dynamic manner. An interrupt arbitration system is provided to process at least one request associated with an interrupt resource, wherein the request includes at least two dimensions related to an interrupt and an interrupt service component. An arbiter processes the request and returns a subset of interrupt resource ranges in view of available system resources. This multi-dimensional mapping of resources enables coordination across resource pools, processors, buses, and/or other components while mitigating possible run-time problems attributed to one-dimensional systems that may find that suitable resources are unavailable.

34 Claims, 13 Drawing Sheets

CONCURRENT ARBITRATION OF MULTIDIMENSIONAL REQUESTS FOR INTERRUPT RESOURCES

TECHNICAL FIELD

The present invention relates generally to computer systems, and more particularly to a system and method that employs multi-dimensional mapping of a range of potentially available interrupt resources that satisfy a given request.

BACKGROUND OF THE INVENTION

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the heart of these systems, include processor support functionality such as advanced memory controllers and interrupt controllers that route a plurality of system interrupts to one or more intelligent devices or components. As systems become more complex, such as in a multi-processing system, management of interrupt resources (e.g. managing, processing, and allocating interrupt requests (IRQ)), has become ever more challenging.

In one example of a modern processing architecture, within a Plug and Play (PnP) subsystem employed in many computer systems, there is a concept of an "arbiter." This is generally a software plug-in, supplied by a Plug and Play Manager or a device driver, for example, which arbitrates resources for other devices. Resources are an aspect of Plug and Play that can be expressed as a range. Memory address space on a PCI bus, for example, can be expressed as a starting address and an ending address. In this example, a PCI driver provides an arbiter for memory address space on a PCI bus.

Interrupt resources (also known as IRQs) are arbitrated much like any other resource. Respective IRQs can be expressed as a range, usually as IRQ 1 through IRQ 10, for example. If a device needs an IRQ, it may request resources via PnP messages, referred to as IRPs. Thus, an associated arbiter decides which IRQ is appropriate, and assigns a specific resource for the task at hand. This typically operates in existing PnP subsystems, by assigning an IRQ first, and then determining other data surrounding the IRQ, such as an affinity mask, which is a set of processors that can be targeted by the interrupt. This attachment of extra information associated with the IRQ generally occurs in a "resource translation" phase of resource assignment.

Previous methods, which involved arbitrating an IRQ and then selecting associated data after the fact, was generally sufficient for earlier operating systems, but it was not always flexible enough for emerging I/O bus technologies. It also made it difficult for administrators to intelligently determine a set of processors that would be targeted by a specific device's interrupts. Also, the infrastructure in Plug and Play subsystems—as well as others, operates with device resources in a one-dimensional manner, wherein respective resources are treated separately.

Resources can be, but are not limited to, the following types: I/O Ports; Memory locations; IRQs; DMA channels; and Bus Numbers. While a device may need resources in multiple categories, respective resource requests are generally taken separately, and represented as a one-dimensional range. A device (A) may, for example, request a resource set that appears like the following:
  Any 16 I/O ports;
  Any 256 bytes of memory address space;
  One IRQ between 0 and 255; and
  Four bus numbers.
  Or, a different device (B) may request:
  I/O Port 0x220 through I/O port 0x221; and
  IRQ 3 or IRQ 5.

The PnP subsystem generally breaks down the problem into separate resource requests and passes them onto the arbiter. The arbiter for I/O ports, would then receive a request such as:
  Device A—any 16 I/O ports;
  Device B—I/O Port 0x220 through I/O port 0x221.

The arbiter would then attempt to satisfy these requests. This one-dimensional view of resources is typically suitable for most resource types except IRQs. In order for a device to interrupt the processor, the device has to be connected to an input on an interrupt controller and it also has to insert an interrupt service routine (ISR) into an associated interrupt descriptor table (IDT). Thus, the choices involved in interrupt assignment are inherently two-dimensional.

This two-dimensionality was not completely understood when PnP subsystems in various operating systems were originally designed. In one case, an 8259 interrupt controller has a relatively fixed IRQ-to-IDT mapping. Generally, operating systems program a base IDT entry, 0x70 for example, for IRQ 0. Thus, IRQ 9 will utilize IDT entry 0x79. Furthermore, since the IDT exists separately for respective processors in the machine, if the machine has more than one processor, the IDT entry component of the interrupt assignment is itself multi-dimensional. Complicating the matter even more, new I/O bus technologies, summed up in the term Message-Signaled Interrupt, allow a device to trigger more than one IRQ, or sometimes cause a processor to jump through an IDT entry to an ISR without involving an IRQ.

These aspects, taken together, indicate that traditional approaches, which involve selecting an IRQ in the arbitration process and then selecting IDT entries at a later time, may cause operating system problems. One factor is that there may not be enough IDT entries available, or the ones that are available may be associated with processors that are not optimal. Thus, the arbiter may answer the PnP manager indicating that there is an IRQ that is applicable for a device, but after assignment is achieved, the device still would not be able to deliver an interrupt.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that provide multi-dimensional mapping, dynamic management, and control of interrupt resources in a concurrent manner. In one aspect, one or more interrupt resources are requested by a requesting component, wherein the interrupt resources relate to system interrupt assignments and their associated interrupt descriptor table mappings. The interrupt assignments generally relate to inputs, sources, or events that cause processors to exit from current code execution in order to service code relating to the interrupt, whereas the descriptor table provides memory locations that indicate where (in memory) service or code execution is to commence when servicing the interrupt.

An arbiter receives the request for resources, and essentially answers yes or no as to whether or not the request can be satisfied. For example, the requesting component may request three interrupt resources, wherein the arbiter satisfies the request, if possible, by returning interrupt assignments 0 through 2 (or other interrupt range), and also returns associated descriptor table mappings for the respective interrupt assignments (e.g., 0×090 through 0×092), thus facilitating that both an interrupt and descriptor table can be mapped and ultimately executed. In this manner, interrupts and respective mappings are dynamically assigned/determined during a negotiation phase between the requesting component and the arbiter resulting in a multi-dimensional mapping of interrupts and their respective descriptor table assignments. In contrast to conventional one-dimensional systems, that merely assign an interrupt and have resultant descriptor tables map by default to the assignment or assigned at a later time, the present invention provides a flexible two (or more) dimensional mapping that facilitates execution of interrupts in more complex systems such as multi-processor/multi-bus operating systems while mitigating possible uncertainty or execution problems involved with assigning an interrupt and selecting a descriptor table entry by default or at a later time.

In one particular aspect of the present invention, a contiguous device interrupt arbitration system and process is provided that integrates arbitration of one or more Interrupt Requests (IRQ) for a device with other I/O bus resource interrupts. Such interrupts can be generated from substantially any device or component and include such aspects as message signaled interrupts that can allow a given device to generate more than one IRQ. Various system buses can also be employed and managed that include local processor buses, system-wide buses as well as more specialized buses such as PCI and ISA buses. As noted above, the present invention replaces prior serial or one-dimensional interrupt handling of relatively fixed IRQ-to-IDT resource mapping with a more flexible two-dimensional mapping of a range of resources that are potentially available to satisfy a given request, wherein an IDT is an Interrupt Descriptor Table that identifies sections of code that run in response to a particular IRQ. Thus, the present invention essentially merges arbitration for an IRQ with an arbitration of other interrupt-related data in order that other features become possible such as:

Intelligent assignment and management of target processor sets for interrupts;

Assignment of interrupts that employ IDT entries, but not interrupt controller inputs;

Assignment of interrupts that will be delivered on processors that are physically close to devices that generate the respective interrupts;

The ability to control or dynamically tune a system based upon monitored and/or changing conditions and influencing interrupt assignment policy; and/or Optimization for non-uniform memory architectures.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

Figure 1:
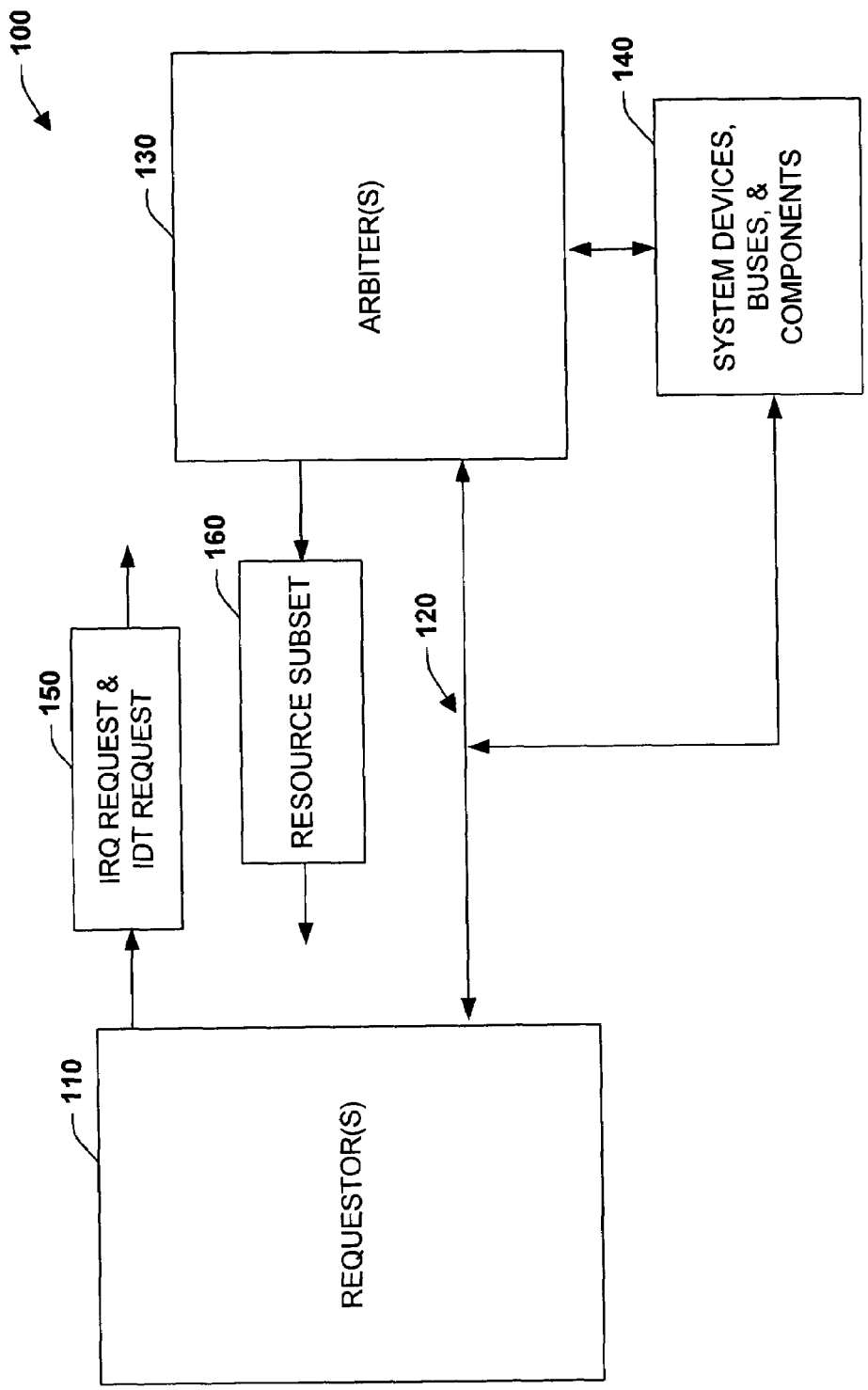
FIG. 1 is a schematic block diagram of an interrupt arbitration system in accordance with an aspect of the present invention.

The present invention relates to a system and methodology to facilitate negotiation, assignment, and management of interrupt resources in a flexible and dynamic manner. An interrupt arbitration system is provided to process at least one request associated with an interrupt resource, wherein the request includes at least two dimensions related to an interrupt and an interrupt service component such as an interrupt descriptor table entry, for example. An arbiter processes the request and returns a subset of interrupt resource ranges in view of available system resources. This multi-dimensional mapping of resources enables coordination across resource pools, processors, buses, and/or other components while mitigating possible run-time problems attributed to one-dimensional systems that may find that suitable resources are unavailable. By enabling an arbitration process to be multi-dimensional, respective system arbiters can be essentially certain that resource assignments are viable before committing to an interrupt assignment.

As used in this application, the terms "component," "requester," "arbiter," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The following terms are also defined for purposes of clarity such as defining one or more acronyms that may be employed as follows:

Interrupt—An action taken by an I/O device that causes the processor to start servicing the device. The code that the processor executes is called an "Interrupt Service Routine," or ISR, and it is part of an associated device driver.

Interrupt Controller—A device within a computer that presents interrupts to a processor. It is attached concurrently to respective I/O devices and to the processor.

IRQ—Interrupt Request. This term can be employed in various manners. It generally denotes a number associated with a distinct interrupt controller input.

IDT—Interrupt Descriptor Table. In an Intel x86 processor, for example, there is a table in memory that lists 256 different portions of code that can be run in response to an interrupt. In response to an interrupt, the processor receives a number between 0 and 255 from the interrupt controller and then jumps to the code listed by the respective entry in the table. In non x86-processors, this behavior can be (and usually is) emulated in software. Each processor in a single machine generally has a distinct IDT.

IDT Entry—Single listing in the IDT, usually associated with a specific IRQ.

8259 PIC—Traditional Programmable Interrupt Controller that typically exists in all personal computers (PCs). It has 16 IRQs. It generally cannot operate in multi-processor machines.

APIC—Advanced Programmable Interrupt Controller. A full APIC implementation involves parts distributed throughout a machine. If these parts exists, multi-processor operation becomes possible. APIC systems are not limited to 16 IRQs.

Local APIC—Part of an APIC system that exists within a processor.

I/O APIC—Part of an APIC system that collects interrupts from devices. Exists outside the processor.

Message-Signaled Interrupt (MSI)—This is an interrupt that is delivered as a write cycle (or perhaps a packet) on an I/O bus, and not through a dedicated wire.

Referring initially to FIG. 1, an interrupt arbitration system 100 is illustrated in accordance with an aspect of the present invention. A requestor 110 (or requesting component) communicates over a bus 120 to an arbiter 130 in order to determine available system resources that may be utilized by the requestor to perform one or more tasks. Such resources may be related to I/O ports, memory locations, DMA channels (Direct Memory Access), bus numbers, and/or interrupt requests (IRQs), wherein arbiters typically exist for each type of resource. These resources may be associated with one or more system devices, buses, and/or other components illustrated at 140 and which are negotiated for via the arbiter 130.

In one aspect, the requestor 110 issues a multidimensional interrupt request (IRQ) 150 associated with one or more interrupt inputs, signals, or assignments, whereby the IRQ is employed to interrupt a processing component (not shown) which is described in more detail below. Along with the request 150, a respective Interrupt Descriptor Table (IDT) entry or data can also be requested in order that the IRQ and IDT can be concurrently mapped, wherein the IDT provides a memory location where interrupt service routines can be executed when a processor receives an associated IRQ. Although the IRQ and IDT data are generally requested in a concurrent manner (e.g., within the same request), it is to be appreciated that these components (IRQ and/or IDT) can be requested on separate requests or queries to the arbiter 130.

Upon receiving the request 150, the arbiter 130 performs an analysis of system resources. If the requested interrupt resources (ISR and IDT) are found to be available, the arbiter 130 returns a resource subset or data packet 160 indicating the resources that can be utilized by the requestor 110. If the resources are not deemed available by the arbiter 130, a code or flag may be returned indicating the requested resources cannot be satisfied. As can be appreciated further requests and arbitrations can subsequently be negotiated. Moreover, other dimensions can be provided for and negotiated in the request 150. For example, a time element could be provided in the request 150, wherein the requested resources are negotiated for specified periods (e.g., Request X interrupts, having Y IDT ranges, for period of less than 1 second—or other time). After the designated period, the resources can be relinquished by the requesting component and negotiated for by other components.

In one specific example of the system 100, the requestor 110 can be a Plug and Play (PnP) manager that communicates with individual plug-in modules referred to as arbiters 130, which decide which resources can be assigned to specific devices. These arbiters are generally not within the PnP manager itself since the PnP manager doesn't typically have internal knowledge of specific bus technologies. The PnP manager does not, for example, know the specifics of selecting I/O ports for devices on a PCI bus. A PCI driver, however, typically keeps track of such details. Thus, the PCI driver generally supplies the arbiter 130. It is to be appreciated that the arbiter 130 can be provided as a global resource and thus arbitrate over various system buses, components, devices, and/or other resources.

Continuing the above PnP example, arbiters typically communicate with the PnP manager using a standard interface. The interface definition generally includes functions for the following:

Testing/analyzing whether a possible set of resources can work.

Committing a specific set of resources that has been requested by the PnP manager.

Querying for the set of devices that might conflict with a resource set.

Marking resources that were already in use by a BIOS (or other component) when a machine booted.

Much of the arbiter's work is provided in a "Test" interface. It essentially answers a yes or no question posed by the PnP manager or requestor 110. The PnP manager queries "can this possible set of resources coexist, and if there are any ambiguities in the resources set, how should they be resolved?" The arbiter 130 answers "no," or it resolves the ambiguities and answers "yes" (e.g., "Yes, Device B can have I/O Ports 0×220 and 0×221 and Device A should use I/O ports 0×2000 through 0×200f.") Typically, arbiters can be implemented using a core library of functions that are centered around resource manipulations. However, the present invention can also utilize this library, for simplicity of implementation and also process many operations, including the multi-dimensionality of IRQ resources, outside of the base library. It is also possible to create an arbiter that functioned with the PnP manager, but which didn't utilize the library.

A function can be created within the library, called FindSuitableRange, that the library calls in order to find a range of available resources. In one implementation (in a memory arbiter, for example,) FindSuitableRange searches for an unclaimed range in the list of available resources. In the interrupt resource aspect, FindSuitableRange searches across available IRQs and available IDT entries.

Various features can be supported with the above infrastructure and include:

1. A component for an administrator (or other control software) to tune the performance of the machine (e.g., PC) by influencing interrupt assignment policy. For example, a control component could monitor system performance over time. Different interrupt resource assignments could then be monitored in view of system performance in order that resources can be re-allocated (automatically and/or manually) and executed in a substantially optimum manner.

2. Message-Signaled Interrupts (MSI).

3. Optimization for Non-Uniform Memory Architecture machines.

Application Programming Interfaces (APIs) can also be provided to expose these features. The following exist for interrupt management:

A component for influencing IRQ target processor policy and IRQ priority policy.

A component for conveying policy and other IRQ-related data to and from an IRQ arbiter.

Figure 2:
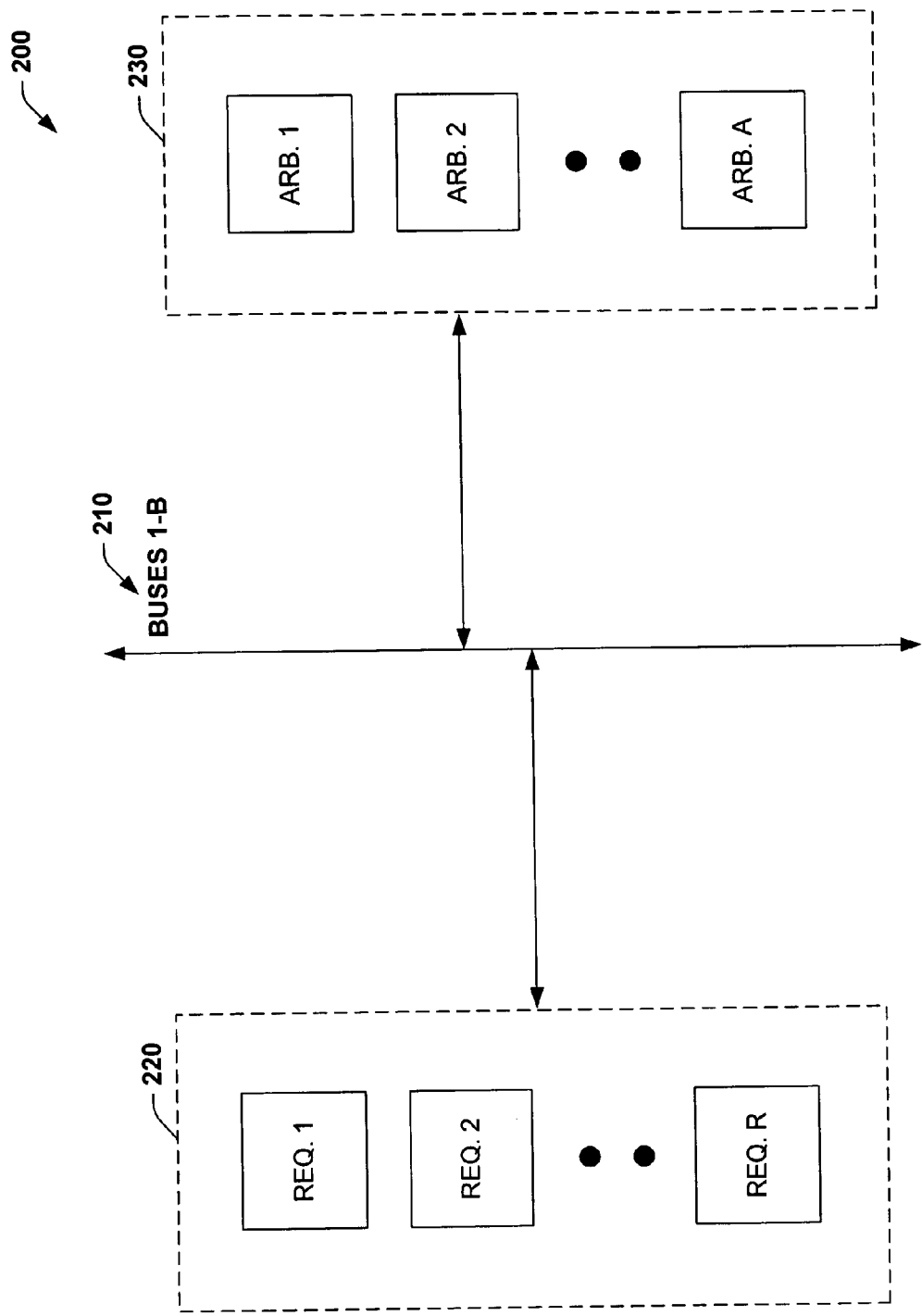
FIG. 2 is a diagram of a multi-component arbitration system in accordance with an aspect of the present invention.

The following exist for manipulating interrupt hardware:

A component for collecting data to enable MSI in hardware.—IRQ_ARBITER_INTERFACE A method to request that an Interrupt Message Service Routine be inserted into the processor's IDT.—IoConnectInterruptEx A method to request that an Interrupt Message Service Routine be removed from a processor's IDT.—IoDisconnectInterruptEx Referring now to FIG. 2, a multi-component arbitration system 200 is illustrated in accordance with an aspect of the present invention. The system 200 illustrates a logical configuration relating to how arbitration can occur between a plurality of requesting components and arbiter components distributed across a multi-bus and/or multi-processor system. In general, requests pass from one software component (or hardware component) to another, and are not generally associated with any bus. In contrast, devices generally exist on a bus, wherein a bus driver may employ bus mechanisms to discover enough about the device to produce requests that will be passed to the arbiter. Thus, devices have properties which, when recognized by the device driver or bus driver, can be converted by driver software into a request that will ultimately be presented to an arbiter, which is typically another software component.

As noted above, the system 200 depicts a logical configuration of components participating in an arbitration process. In this aspect, one or more buses (1-B) at 210 can be employed to provide communications between one or more requesters at 220 (1-R) and one or more arbiters 230 (1-A), wherein A, B, and R are integers respectively. For example, one bus 210 may represent a local bus, system bus, and/or a more specialized bus such as a PCI bus or ISA bus. Requestors 220 may communicate with one or more other requestors and/or arbiters 230 across the buses 210. Likewise, arbiters 230 may communicate with one or more other arbiters and/or requestors across the buses 210. It is to be appreciated that interrupts can be derived from a plurality of sources and components.

After arbitration has occurred, and system interrupts are functional in accordance with the multi-dimensional mapping described above, various components associated with the respective buses may issue interrupts to respective processors. In one example, devices associated with a first bus (e.g., ISA bus) could have interrupts that are related to devices on a second bus (e.g., PCI bus). Such a configuration can exist, wherein interrupts from respective buses are wired-OR together and provided to a processor as a single interrupt. Thus, if a processor were to be interrupted from interrupt 4, for example, and interrupt 4 was an output from an OR gate having interrupt signals from separate buses, then the processor would likely perform polling procedures to determine which bus the interrupt was actually generated from. After servicing the interrupt, the processor would likely perform other polling procedures to determine that respective devices on the associated bus had not attempted to generate another interrupt or that all interrupts had been properly serviced (e.g., if both buses interrupted on interrupt 4, another service routine would then likely be executed).

Figure 3:
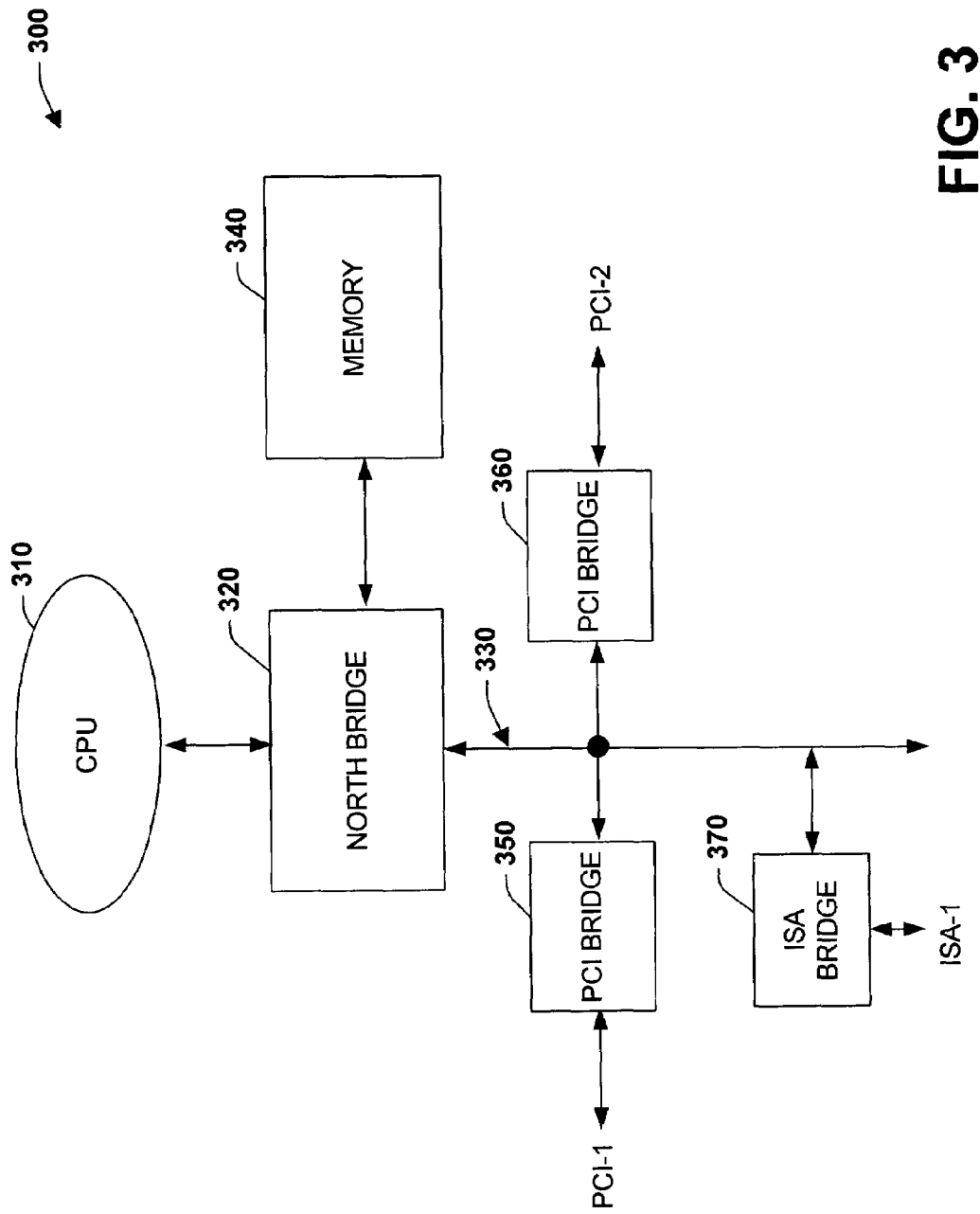
FIG. 3 is a schematic block diagram illustrating an example multi-bus system in accordance with an aspect of the present invention.

Turning to FIG. 3, a system 300 illustrates an example multi-bus system in accordance with an aspect of the present invention. In this aspect, a central processing unit (CPU) 310 communicates via a north bridge adaptor 320 to a system bus 330. The north bridge adaptor also provides access to other resources such as memory 340. As illustrated, two PCI bridges 350 and 360 are provided that communicate with the bus 330. These bridges link to PCI buses 1 and 2 respectively. Also, an ISA bridge 370 operatively couples the bus 330 and ISA bus 1. As can be appreciated a plurality of other buses, adaptors, bridges, and/or other components can be provided that operate with the CPU 310 (or CPUs). Such components can generate interrupts for the CPU in accordance with the multidimensional arbitration systems described herein.

Figure 4:
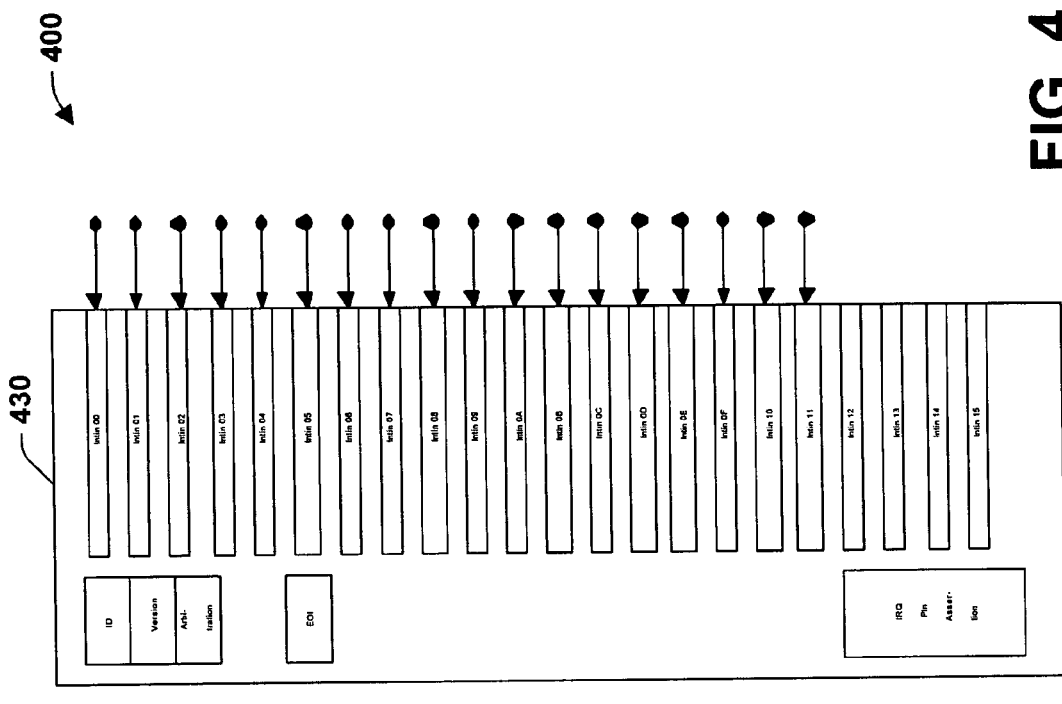
FIG. 4 is a schematic block diagram illustrating an example processor and interrupt controller in accordance with an aspect of the present invention.
Figure 4:
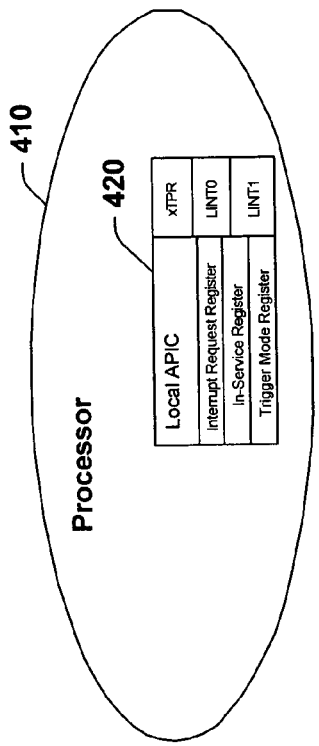

FIG. 4 is a schematic block diagram illustrating an example processor and interrupt controller in accordance with an aspect of the present invention. A portion of a processor 410 is depicted having a local Advanced Programmable Interrupt Controller (APIC) 420 that receives/processes interrupts directed to the processor 410. This can include an interrupt request register, an in-service register indicating which interrupt is currently being serviced, and a trigger mode register. The APIC 420 can receive interrupts directly connected to the processor 410 and/or from indirect sources such as from an I/O APIC 430 that collects interrupts from devices outside the processor 410 or local processing system. As illustrated, the I/O APIC 430 can include inputs for servicing a plurality of interrupts and include functions such as edge or level triggering options for the inputs, pin assertion functions, as well as other programming options. It is to be appreciated that the multidimensional arbitration described above can be employed with substantially any type of processing unit and/or interrupt controller in addition to the example components described herein.

Figure 5:
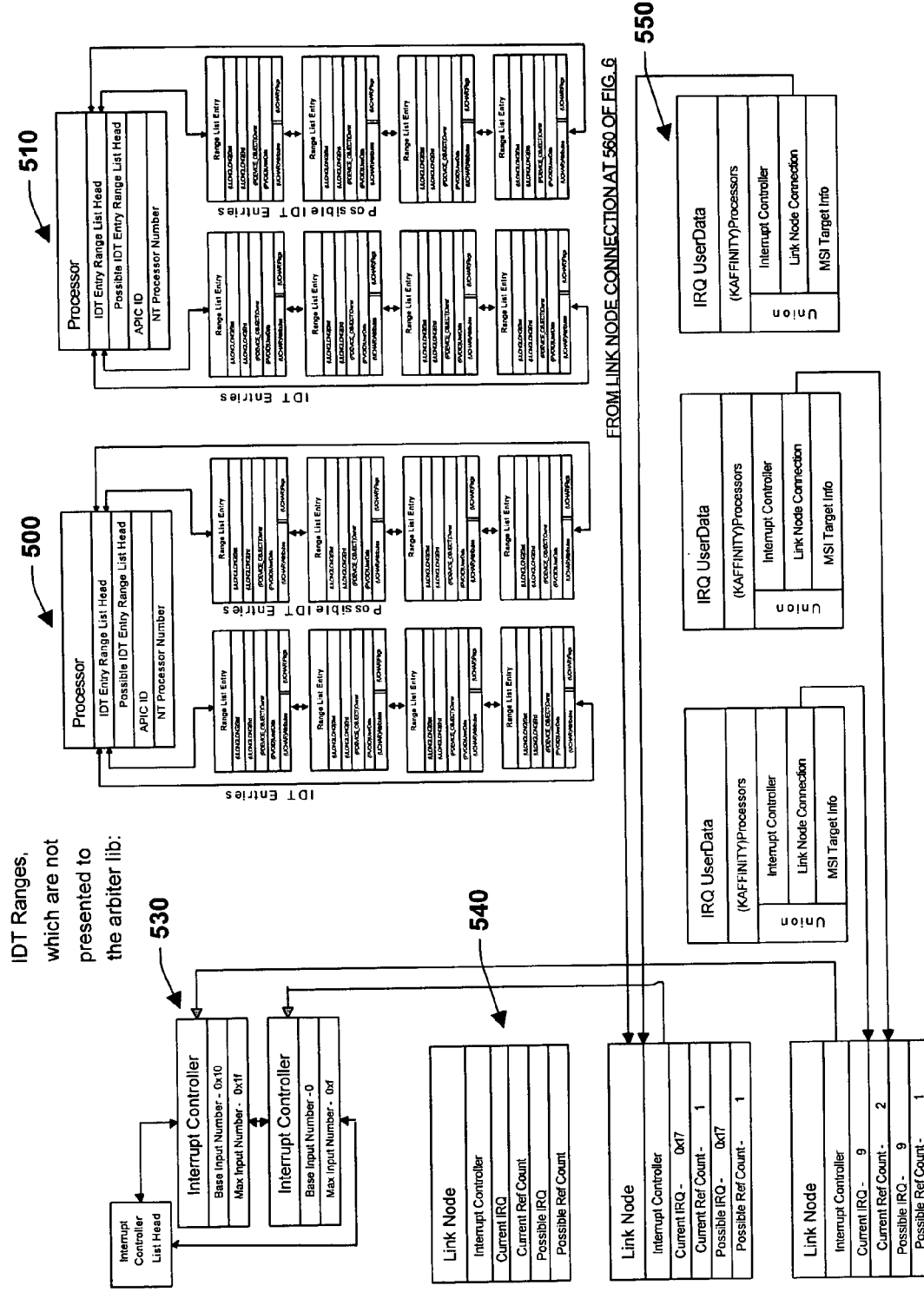
FIGS. 5 and 6 illustrate an exemplary interrupt arbitration system in accordance with an aspect of the present invention.
Figure 6:
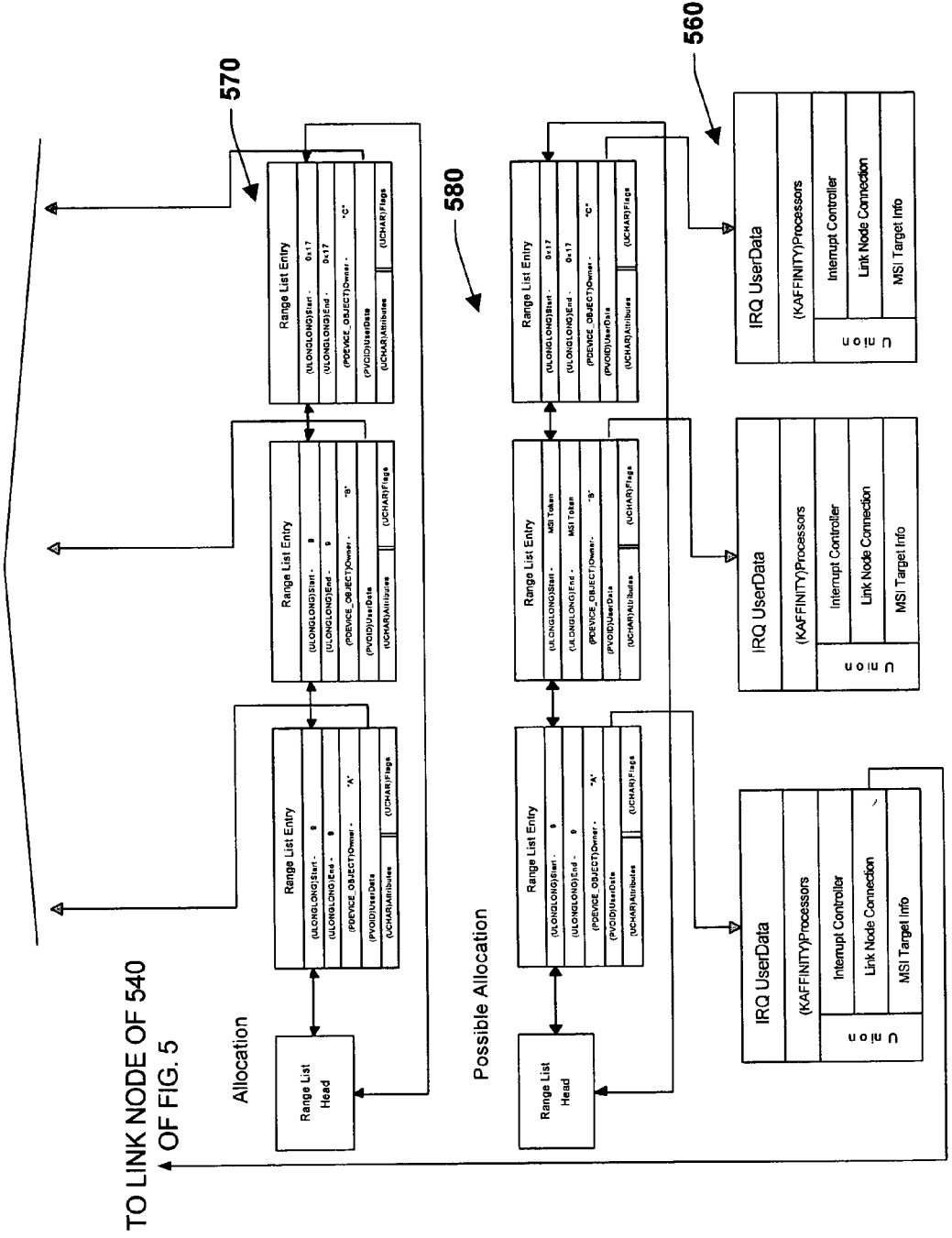

FIGS. 5 and 6 illustrate an exemplary interrupt arbitration system in accordance with an aspect of the present invention. A multiprocessor architecture is depicted having a processor at 510 and 520, wherein the respective processors are shown with associated IDT range entries and possible IDT range entries which are not presented to an arbiter system library (not shown). In addition the processor may interact with interrupt controllers at 530 that receive interrupt inputs from optional link nodes at 540, wherein the link nodes operate as interrupt multiplexers that connect multiple interrupt sources to a single interrupt on the interrupt controllers 530. The link nodes 540 receive input from one or more IRQ user data sources at 550 of FIG. 5 and at 560 From FIG. 6. These sources contain such information as processor information, interrupt controller information., link node connection information, and MSI (Message-Signaled Interrupt) target information. As illustrated the sources at 550 are associated with allocation ranges depicted at 570 of FIG. 6, and the sources at 560 of FIG. 6, are associated with possible allocation ranges at 580 of FIG. 6.

Figure 7:
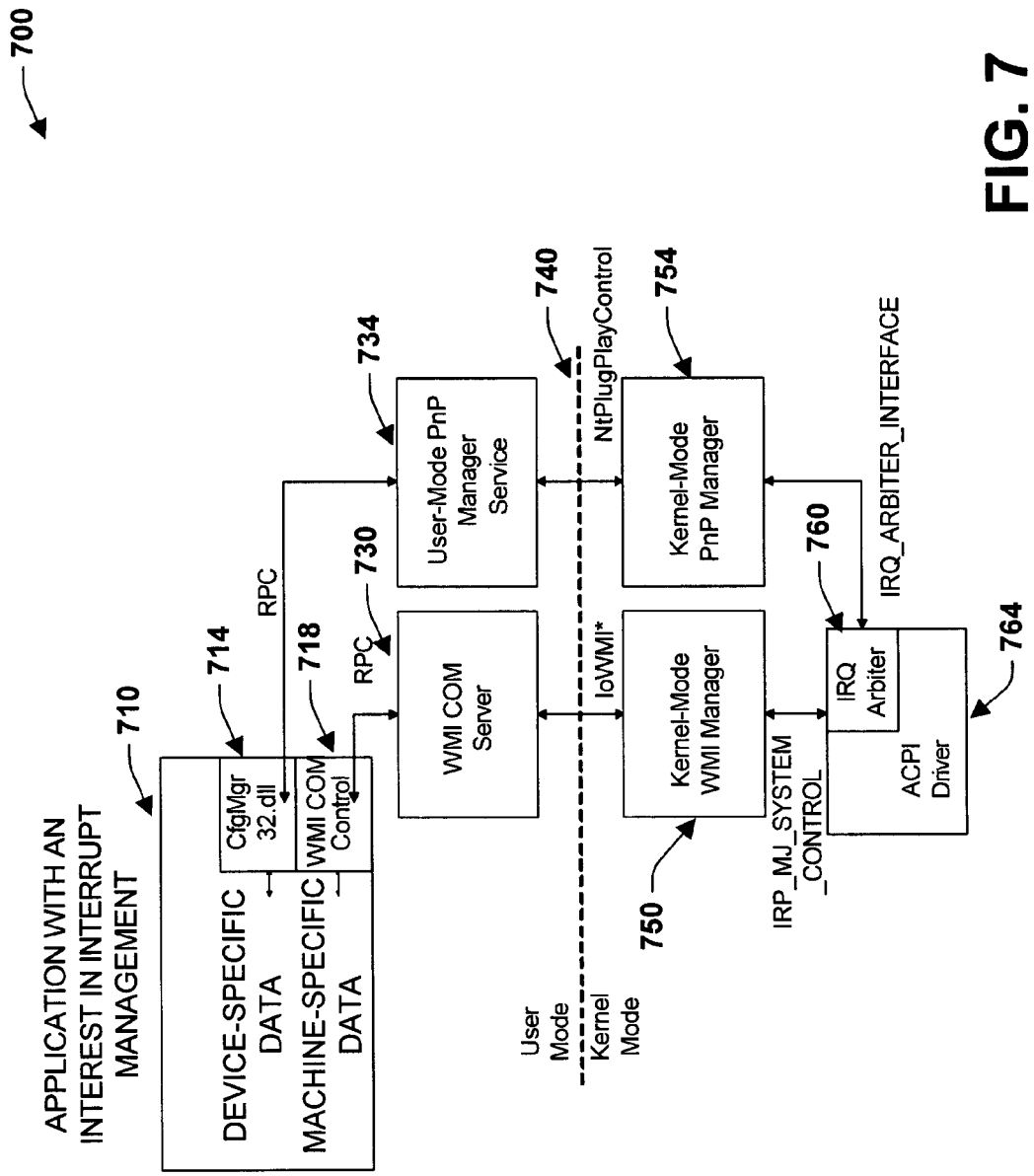
FIG. 7 is a schematic block diagram illustrating an example operating system environment in accordance with an aspect of the present invention.

FIG. 7 illustrates an example operating system environment 700 in accordance with an aspect of the present invention. In the system 700, an appication 710 having a configuration manager 714 for device-specific data, and a Windows Management Infrastructure (WMI) component 718 for machine-specific data internet via remote procedure calls (RPC) with a COM server at 730 and a PnP manager service at 734. These components 730 and 734 interact across a user mode/kernel mode boundary 740 with a kernel-mode WMI manager 750 and a kernel-mode PnP manager 754. The manager's 750 and 754 interact with an IRQ arbiter 760 that is associated with a driver component 764. As described above, interrupt resources are negotiated for in a multidimensional manner. This includes negotiating in conjunction with the IRQ arbiter 760 and respective components that may act directly and/or indirectly with the arbiter.

FIGS. 8-11 are flow diagrams illustrating an example arbitration process in accordance with an aspect of the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 8:
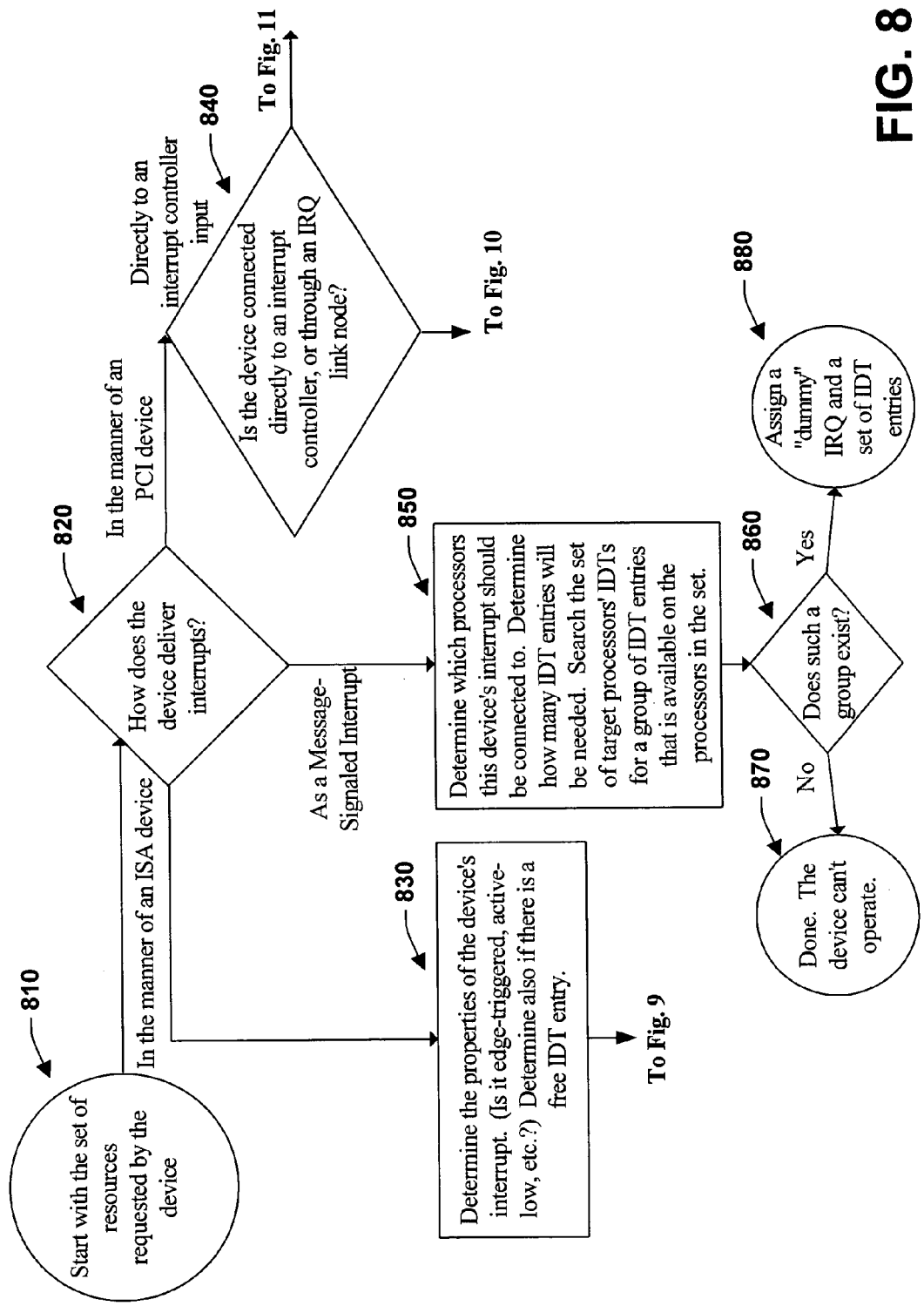
FIGS. 8-11 are flow diagrams illustrating an example arbitration process in accordance with an aspect of the present invention.
Figure 9:
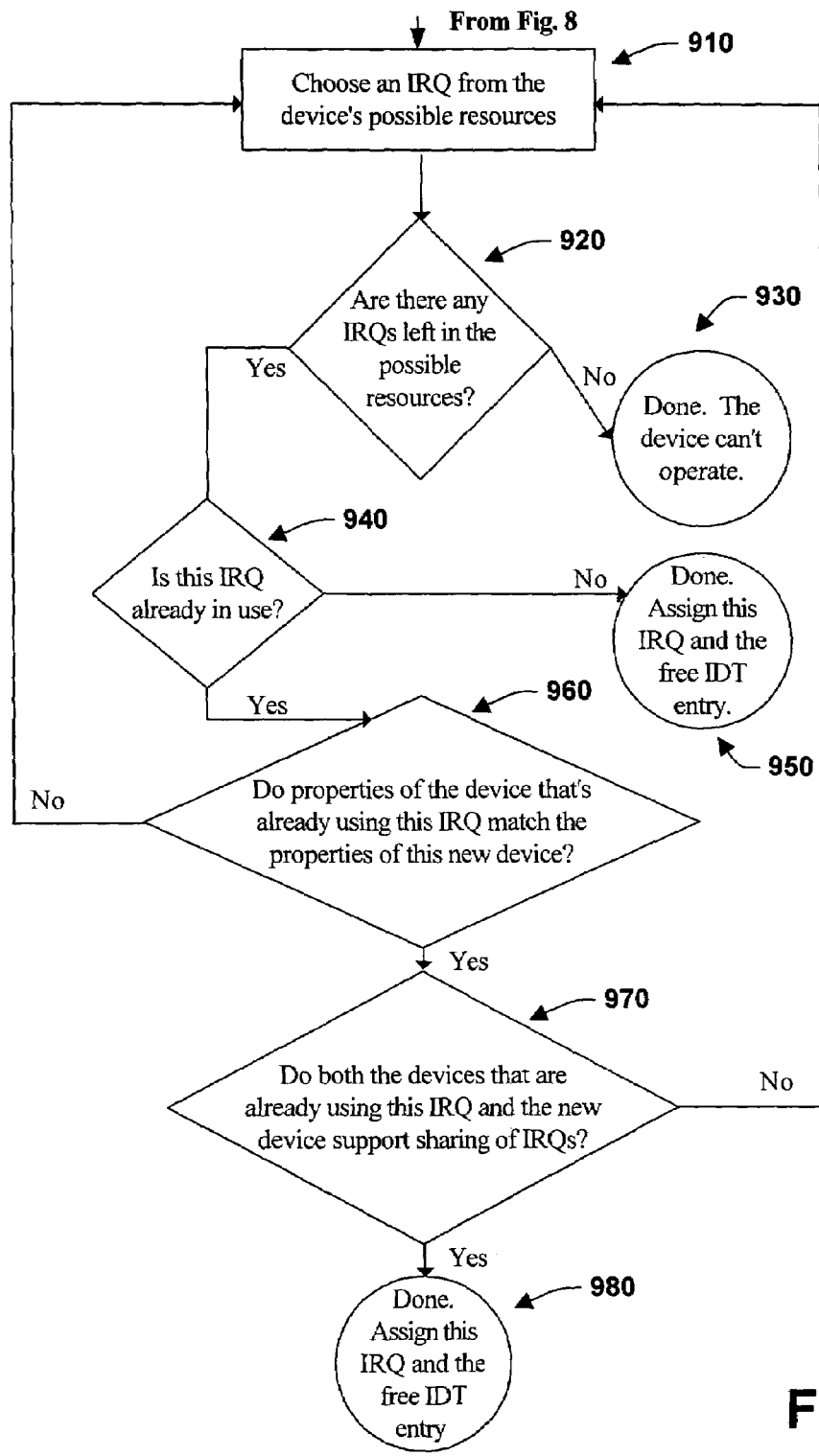
Figure 10:
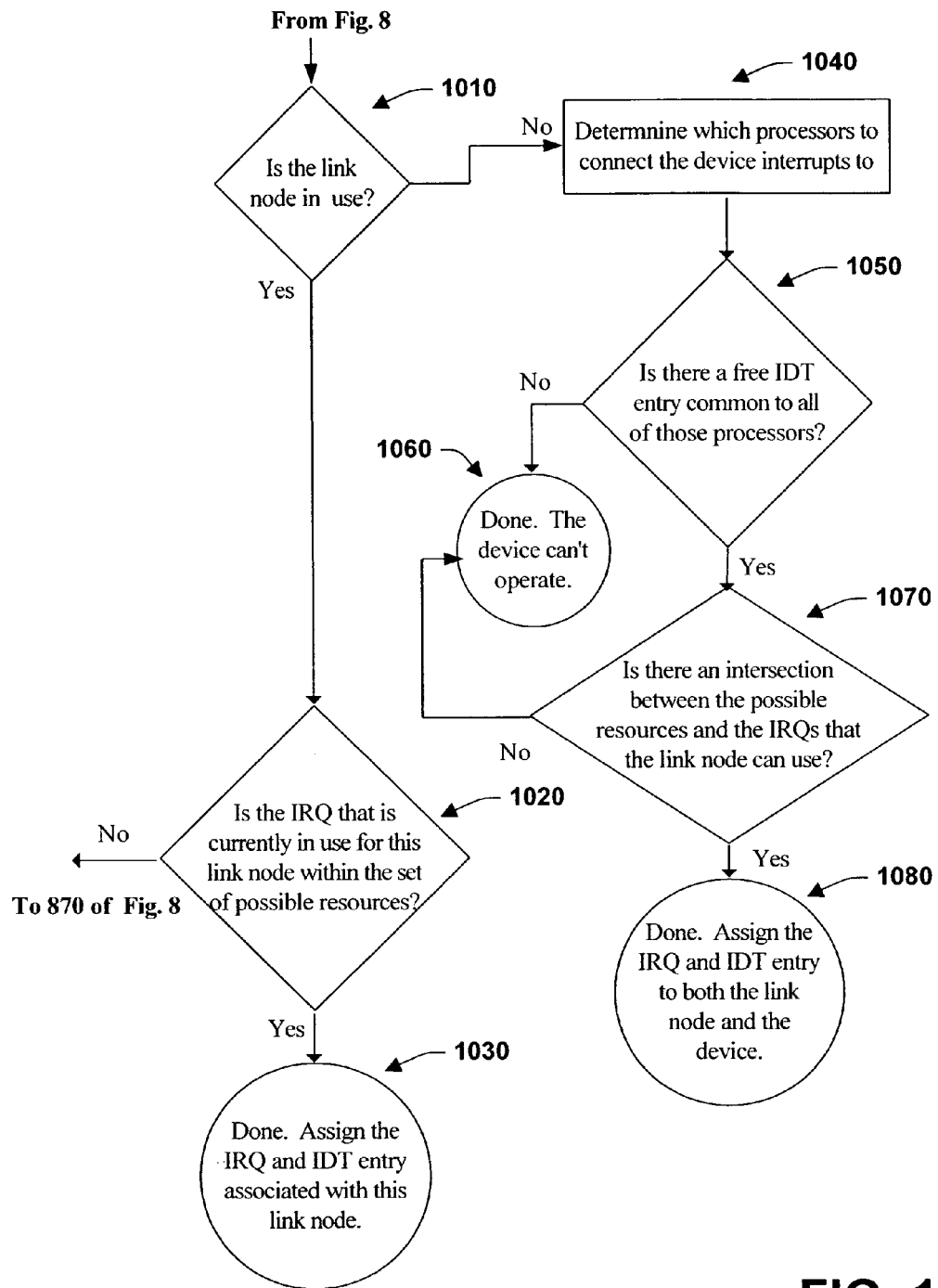
Figure 11:
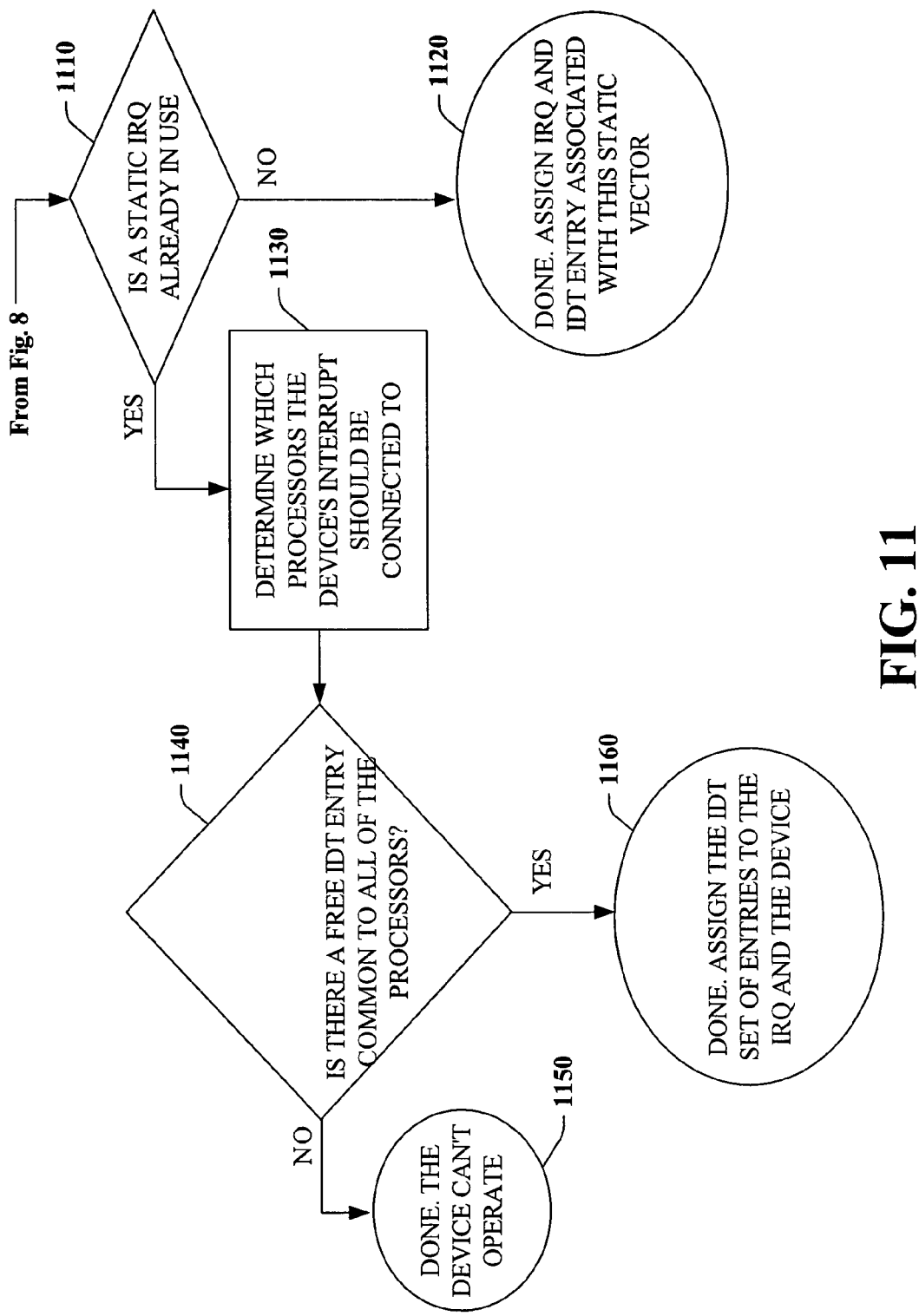

Before proceeding, it is noted that FIG. 8 generally applies to a determination between ISA device processing, Message-Signaled Interrupt processing, and PCI device processing, wherein further ISA device processing is illustrated in FIG. 9 and further PCI device processing is illustrated in FIGS. 10 and 11, respectively.

Proceeding to 810 of FIG. 8, a set of resources is requested by a device. At 820, a decision is made as to how the requesting device delivers interrupts. If an ISA device is detected at 820, the process proceeds to 830, wherein a determination is made regarding the devices interrupt such as edge triggered of active low, for example. Also, a determination is made as to whether there is a free IDT entry. Additional ISA device processing is described with respect to FIG. 9 below.

If a PCI bus device is detected at 820, the process proceeds to 840, wherein a determination is made whether the device a connected to an interrupt controller or an IRQ link node described above. If the device is connected to an interrupt controller at 840, the process proceeds to FIG. 11. If the device is connected to a link node, the process proceeds to FIG. 10.

If message-signaled interrupts are determined at 820, the process proceeds to 850, wherein various procedures occur. Such procedures include determining which processors the device's interrupt should be connected to, determining how many IDT entries will be needed, and searching a set of target processors' IDTs for a group of IDT entries that are available on the processors in the set. At 860, a determination is made as to whether such a group of entries exist. If not, the process proceeds to 870 and ends without satisfying the request. If yes, the process proceeds to 880 and assigns a "dummy" or stub IRQ and a set of IDT entries.

With reference to FIG. 9, further ISA device processing is illustrated. At 910, an IRQ is selected from the ISA device's possible resources. At 920 a detennination is made as to whether any IRQs are left in the possible resources. If not, the process ends at 930 without satisfying the request. If so the process proceeds to 940. At 940, a determination is made as to whether an IRQ is already in use. If not, the process assigns this IRQ and a free IDT entry at 950. If yes, the process proceeds to 960. At 960, the process determines whether properties of the device that is already using the IRQ matches the properties of the new device. If not the process proceeds back to 910 and selects another IRQ. If so the process proceeds to 970. At 970, the process determines whether both the existing device and the new device support sharing IRQs. If not, the process proceeds back to 910 and selects another IRQ. If so, the IRQ is assigned along with a free IDT entry at 980.

Proceeding now to FIG. 10, further PCI device processing for link nodes is illustrated. At 1010, a determination is made as to whether a link node is in use. If so the process proceeds to 1020 and determines whether the IRQ that is currently in use for this link node is within the set of possible resources. If not, the process proceeds back to 870 of FIG. 8 and ends. If yes, the process assigns the IRQ and IDT entry at 1030 associated with the respective link node at 1030.

If the link node was not in use at 1020, the process proceeds to 1040 and determines which processors to connect the device interrupts to. At 1050, a determination is made as to whether IDT entry is available that is common to all processors. If not, the process ends at 1060. If yes, the process proceeds to 1070. At 1070 a determination is made as to whether there is an intersection between the possible resources and IRQs that the link node can use. If so, the IRQ and IDT entry to the link node and the device is assigned at 1080. If not, the process ends at 1060.

Proceeding to FIG. 11, further PCI device processing is provided for devices connected directly to an interrupt controller. At 1110 a determination is made as to whether a static IRQ is already in use. If not the process proceeds to 1120 and assigns an IRQ and IDT entry associated with a static vector. If yes at 1110, the process proceeds to 1130 and determines which processors the device's interrupts should be connected to. At 1140, a determination is made as to whether a free IDT entry is common to the respective processors. If not, the process ends at 1150 without assigning resources. If yes at 1140, the process assigns the IDT set of entries to the IRQ and the device at 1160.

Figure 12:
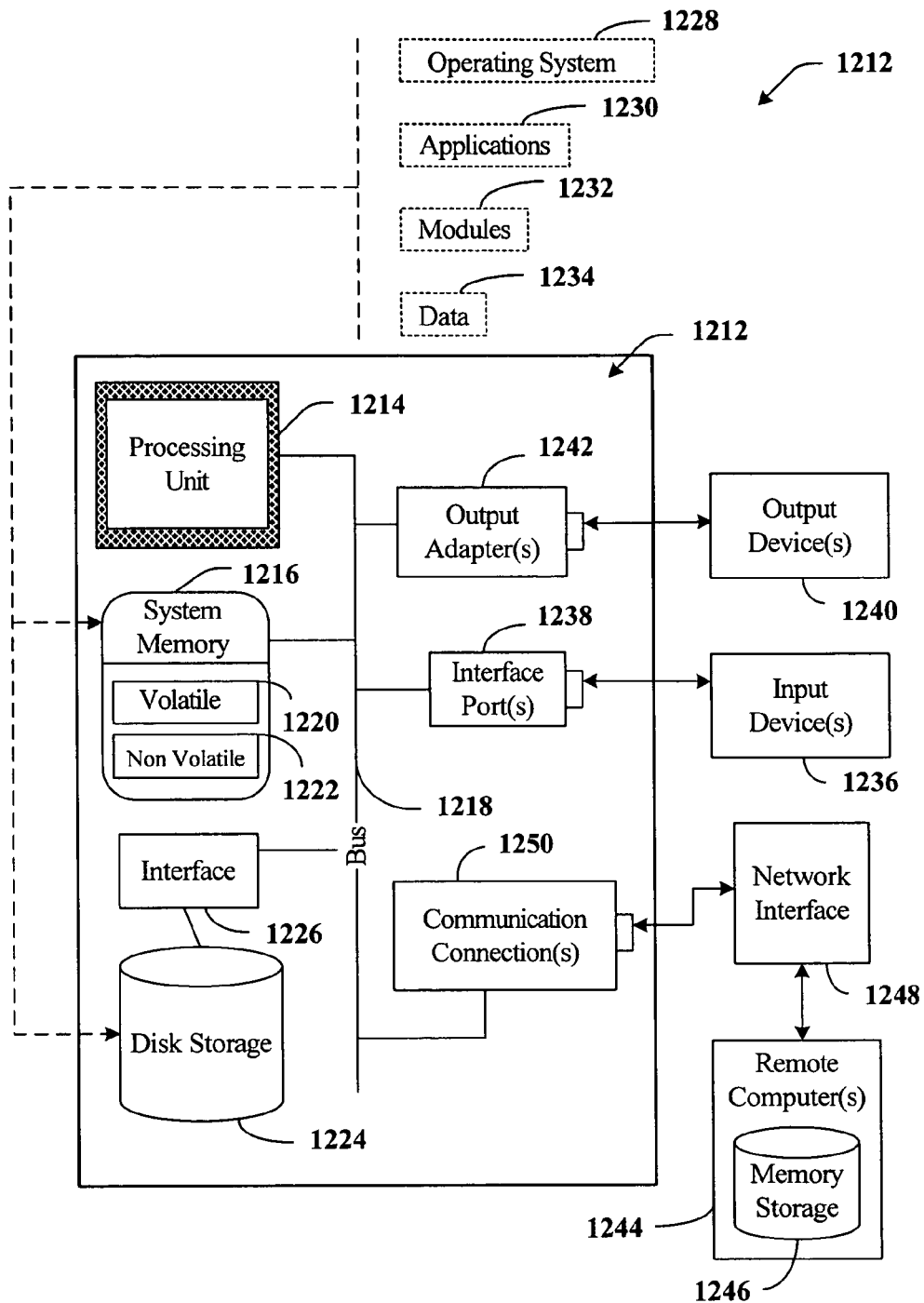
FIG. 12 is a schematic block diagram illustrating a suitable operating environment in accordance with an aspect of the present invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
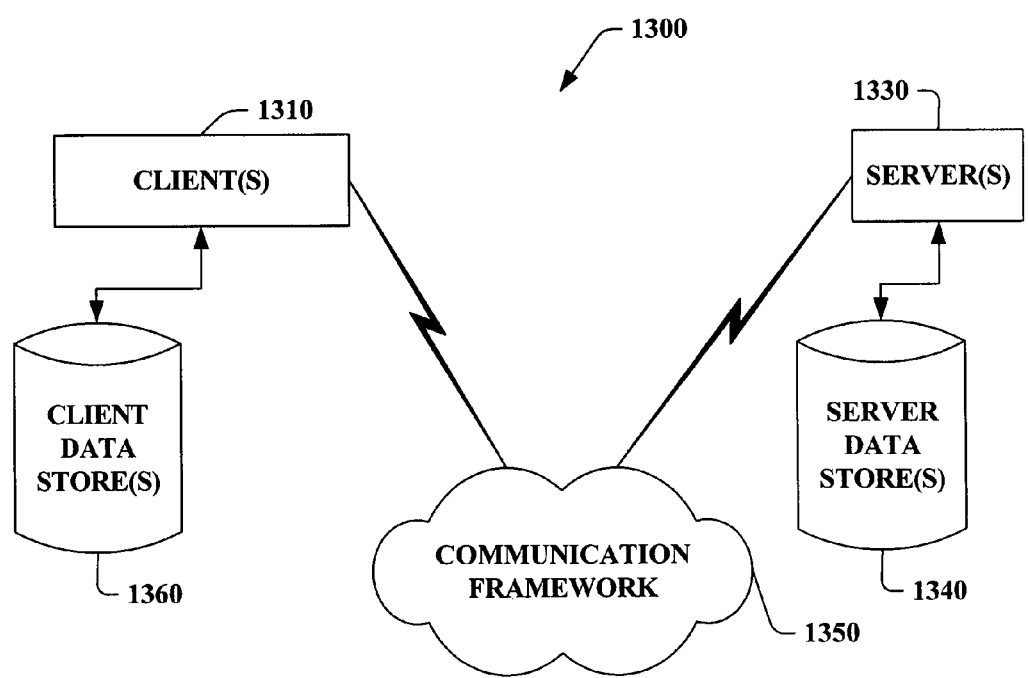
FIG. 13 is a schematic block diagram of a sample-computing environment with which the present invention can interact.

FIG. 13 is a schematic block diagram of a sample-computing environment 1300 with which the present invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the present invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented interrupt arbitration system, comprising:
   at least one request associated with an interrupt resource and a requesting component wanting allocation of the interrupt resource, the request including at least a requested amount of time to allocate the interrupt resource to the requesting component; and
   at least one arbiter to process the request and return a subset of interrupt resource ranges in view of available system resources.

2. The system of claim 1, further comprising the requesting component communicates to the arbiter in order to determine available system resources that may be utilized by the requesting component to perform one or more tasks.

3. The system of claim 1, the interrupt service component is associated with an Interrupt Descriptor Table (IDT) entry that is concurrently mapped with an IRQ.

4. The system of claim 1, the arbiter performs an analysis of system resources, and if requested interrupt resources are found to be available, the arbiter returns a resource subset or data packet indicating the interrupt resources that can be utilized by a requesting component.

5. The system of claim 1, the request further comprising at least one other dimension including a priority component.

6. The system of claim 1, further comprising a control component to tune performance of a machine by influencing interrupt assignment policy.

7. The system of claim 1, the interrupt is a Message-Signaled Interrupts (MSI).

8. The system of claim 1, further comprising at least one of the following Application Programming Interfaces: IRQ_ARBITER_INTERFACE, IoConnectInterruptEx, and IoDisconnectInterruptEx.

9. The system of claim 1, the interrupt is associated with at least one of a local bus, a system bus, a PCI bus, and an ISA bus.

10. The system of claim 1, further comprising at least one local Advanced Programmable Interrupt Controller (APIC) that processes interrupts directed to a processor and an I/O APIC that collects interrupts from devices outside the processor.

11. The system of claim 1, further comprising at least one link node to multiplex a plurality of interrupts.

12. The system of claim 1, farther comprising at least one user-mode component and at least one kernel-mode component to arbitrate an interrupt.

13. A computer readable medium having computer readable instructions stored thereon for implementing the arbiter and processing the request of claim 1.

14. The system of claim 2, the system resources are related to at least one of I/O ports, memory locations, DMA channels (Direct Memory Access), bus numbers, and interrupt requests (IRQs).

15. The system of claim 2, the requesting component issues a multidimensional interrupt request (IRQ) associated with one or more interrupt inputs, signals, or assignments, the IRQ is employed to interrupt at least one processing component.

16. The system of claim 2, the requesting component is a Plug and Play (PnP) manager that communicates with individual plug-in modules which decide which resources can be assigned to specific devices.

17. The system of claim 3, the IRQ is mapped in accordance with a first request and the IDT entry is mapped in accordance with a separate request.

18. The system of claim 4, if the interrupt resources are not deemed available by the arbiter, a code or flag is returned to the requesting component indicating that requested interrupt resources cannot be satisfied.

19. The system of claim 16, further comprising a driver that supplies an arbiter to arbitrate interrupts.

20. The system of claim 6, further comprising a monitor component to provide feedback to the control component regarding system performance.

21. The system of claim 9, the interrupt is at least one of derived from at least two components and coupled to one or more devices that are associated with one or more buses.

22. The system of claim 14, further comprising at least one arbiter for a respective system resource.

23. The system of claim 19, the arbiter includes an interface associated with a function related to at least one of the following: testing/analyzing whether a possible set of resources operate; committing a specific set of resources that has been requested by a PnP manager; querying for a set of devices that conflict with a resource set; and marking resources that were in use by an operating system component when a machine is booted.

24. The system of claim 9, further comprising at least one bus adaptor to communicate between buses.

25. The system of claim 22, the system resources are associated with one or more system devices, buses, or other components which are negotiated for via the at least one arbiter.

26. The system of claim 23, the arbiter is associated with a library function.

27. The system of claim 26, the library function is associated with a FindSuitableRange function that searches across available IRQs and available IDT entries.

28. A computer implemented method that when executed on one or more processors facilitates managing interrupt resources, comprising:
   determining an interrupt range for an interrupt request;
   determining an interrupt table entry for the interrupt range;
   concurrently assigning the interrupt range and the interrupt table in response to the interrupt request and in view of available system resources, the interrupt request including a requested period of a resource's time to be allocated to a requesting component; and
   monitoring system performance and influencing interrupt assignment policy to tune system performance.

29. The method of claim 28, farther comprising determining whether interrupts apply to at least one of an ISA device, a PCI device, and a message-signaled interrupt device.

30. The method of claim 28, farther comprising determining if interrupts are shared by more than one device.

31. The method of claim 28, further comprising determining whether interrupts are connected to an interrupt controller input directly or to a link node.

32. The method of claim 28, further comprising matching interrupt properties of at least two devices.

33. A system to facilitate interrupt processing, comprising:
- means for generating a request for an interrupt resource, the request comprising a requested interval of a resource's time to be allocated to a requesting component;
- means for satisfying the request;
- means for processing the request as an interrupt assignment and an interrupt table entry;
- means for monitoring interrupt resource assignments; and
- means for tuning system performance in view of the monitored interrupt resource assignments by adjusting interrupt assignments.

34. A computer readable medium having an instruction stored thereon that when transmitted between two processes executing on one or more processors facilitates interrupt resource assignment, comprising:
- a first data field related to a request for an interrupt resource, the request includes at least one interrupt assignment, at least one interrupt table entry associated with the request, and at least one interrupt resource assignment duration to requesting component; and
- a second data field related to a resource subset associated with the request.

* * * * *

UNITED STATES PATENT AND TRADEMARK OFFICE
CERTIFICATE OF CORRECTION

| | | |
|---|---|---|
| PATENT NO. | : 7,363,407 B2 | Page 1 of 1 |
| APPLICATION NO. | : 10/673805 | |
| DATED | : April 22, 2008 | |
| INVENTOR(S) | : Jacob Oshins | |

It is certified that error appears in the above-identified patent and that said Letters Patent is hereby corrected as shown below:

In column 9, line 3, delete "information.," and insert -- information, -- therefor.

In column 9, line 11, delete "appication" and insert -- application -- therefor.

In column 9, line 14, delete "internet" and insert -- interact -- therefor.

In column 10, line 8, delete "detennination" and insert -- determination -- therefor.

In column 10, line 16, delete "not" and insert -- not, -- therefor.

In column 13, line 53, in Claim 12, delete "farther" and insert -- further -- therefor.

In column 14, line 56, in Claim 29, delete "farther" and insert -- further -- therefor.

In column 14, line 60, in Claim 30, delete "farther" and insert -- further -- therefor.

Signed and Sealed this
Twenty-second Day of February, 2011

David J. Kappos
*Director of the United States Patent and Trademark Office*